(12) United States Patent
Hotate et al.

(10) Patent No.: US 8,724,101 B2
(45) Date of Patent: May 13, 2014

(54) OPTICAL FIBER CHARACTERISTIC MEASURING DEVICE AND METHOD

(75) Inventors: Kazuo Hotate, Tokyo (JP); Takashi Yari, Nagoya (JP); Masahito Ishioka, Nagasaki (JP); Yoshihiro Kumagai, Tokyo (JP); Kazushi Oishi, Tokyo (JP)

(73) Assignees: Kazuo Hotate, Tokyo (JP); Mitsubishi Heavy Industries, Ltd., Tokyo (JP); Yokogawa Electric Corporation, Tokyo (JP)

( * ) Notice: Subject to any disclaimer, the term of this patent is extended or adjusted under 35 U.S.C. 154(b) by 520 days.

(21) Appl. No.: 12/918,263

(22) PCT Filed: Feb. 20, 2009

(86) PCT No.: PCT/JP2009/053066
§ 371 (c)(1),
(2), (4) Date: Oct. 22, 2010

(87) PCT Pub. No.: WO2009/104751
PCT Pub. Date: Aug. 27, 2009

(65) Prior Publication Data
US 2011/0032517 A1    Feb. 10, 2011

(30) Foreign Application Priority Data
Feb. 21, 2008  (JP) ................................ P2008-039960

(51) Int. Cl.
*G01N 21/00* (2006.01)
*G01M 11/00* (2006.01)

(52) U.S. Cl.
CPC ............ *G01M 11/332* (2013.01); *G01M 11/33* (2013.01); *G01M 11/334* (2013.01); *G01M 11/3145* (2013.01)
USPC ........................................................ 356/73.1

(58) Field of Classification Search
USPC ............ 356/73.1, 12, 13; 250/227.13–227.19
See application file for complete search history.

(56) References Cited

U.S. PATENT DOCUMENTS 6,055,044 A * 4/2000 Uchiyama et al. ........... 356/73.1

FOREIGN PATENT DOCUMENTS

JP          3667132 B2    6/2000
(Continued)

OTHER PUBLICATIONS

Kazuo Hotate, Optical Fiber Characteristic Measuring Apparatus and Optical Fiber Characteristic Measuring Method, Jun. 6, 2007, European Patent Office, WO2007063774.*

*Primary Examiner* — Tarifur Chowdhury
*Assistant Examiner* — Sunghee Y Gray
(74) *Attorney, Agent, or Firm* — Sughrue Mion, PLLC (57) ABSTRACT

An optical fiber characteristic measuring device of the present invention includes: a light source which emits laser light modulated at a predetermined modulation frequency; an incident section which causes the laser light from the light source as continuous light and pulsed light to be incident from one end and other end of an optical fiber respectively; a timing adjuster which causes light emitted from the optical fiber to pass therethrough at a predetermined timing; and a light detector which detects the light which passes through the timing adjuster, and measures a characteristic of the optical fiber by using a detection result of the light detector, and the device includes: a synchronous detector which synchronously detects the detection result of the light detector by using a synchronization signal having a predetermined frequency; and a frequency setter which changes the frequency of the synchronization signal in a case where the modulation frequency at the light source is an integer multiple of the frequency of the synchronous signal.

9 Claims, 7 Drawing Sheets

(56) References Cited

FOREIGN PATENT DOCUMENTS

| | | | |
|---|---|---|---|
| JP | 3607930 A | 1/2003 | |
| JP | 2007-155409 A | 6/2007 | |
| WO | 2007/086357 A1 | 8/2007 | |

* cited by examiner

OPTICAL FIBER CHARACTERISTIC MEASURING DEVICE AND METHOD

CROSS REFERENCE TO RELATED APPLICATIONS

This application is a National Stage of International Application No. PCT/JP2009/053066 filed Feb. 20, 2009, claiming priority based on Japanese Patent Application No. 2008-039960 filed Feb. 21, 2008, the contents of all of which are incorporated herein by reference in their entirety.

TECHNICAL FIELD

The present invention relates to an optical fiber characteristic measuring device and method that use an optical fiber as a sensor to measure temperature distribution, strain distribution, and other characteristics, in the long direction of the optical fiber.

Priority is claimed on Japanese Patent Application No. 2008-039960, filed Feb. 21, 2008, the content of which is incorporated herein by reference.

BACKGROUND ART

As well known, an optical fiber characteristic measuring device uses an optical fiber itself as a sensor by making continuous light or pulse light incident to the fiber and receiving scattering light or reflected light generated in the fiber. Hitherto, various types of optical fiber characteristic measuring device have been proposed. As the scattered light received by the optical fiber characteristic measuring device in order to measure the characteristics of the optical fiber, the optical fiber characteristic measuring device uses Rayleigh scattering light, Brillouin scattering light, Raman scattering light, or the like; as the reflected light it uses Fresnel reflected light or the like.

Patent Document 1 below discloses an optical fiber characteristic measuring device that makes frequency-modulated continuous lights (pump light and probe light) incident to an optical fiber from both its ends, forming a cyclic correlation peak of the pump light and the probe light along the optical fiber, and measures the characteristics of the optical fiber by utilizing characteristics that probe light is amplified only at the correlation peak by stimulated Brillouin scattering phenomenon. This optical fiber characteristic measuring device varies the position of the correlation peak in the optical fiber while receiving the probe light amplified at each position, and thereby measures characteristics in the long direction of the fiber.

Patent Document 2 below discloses an optical fiber characteristic measuring device that makes frequency-modulated continuous light (probe light) and pulse light (pump light) incident respectively to one end and the other end of an optical fiber, sequentially generates correlation peaks in accordance with the position of the pump light propagating in the fiber, and, of the light emitted from the optical fiber, obtains only the light (stimulated Brillouin scattering light) from near the measuring point, and thereby measures the characteristics of the fiber near that measuring point. This optical fiber characteristic measuring device moves the measuring point by adjusting the modulation frequency of the probe light and the pump light, and the timing of receiving light emitted from the fiber, whereby it can measure the characteristics at a given position in the long direction of the fiber.

The optical fiber characteristic measuring device disclosed in Patent Document 2 sweeps the optical frequency-difference between the pump light and the probe light while measuring the optical power of the stimulated Brillouin scattering light generated at the correlation peak position, and detects the peak frequency, whereby it can measure the size of the strain and the temperature at that position.

[Patent Document 1] Japanese Patent Publication No. 3667132
[Patent Document 2] Japanese Patent Publication No. 3607930

DISCLOSURE OF INVENTION

Problem to be Solved by the Invention

Each of the optical fiber characteristic measuring devices disclosed in above Patent Documents 1 and 2 uses measure stimulated Brillouin scattering light generated in the optical fiber to measure the characteristic in the long direction of the fiber. Since this stimulated Brillouin scattering light is extremely weak and noise is superimposed on it, use of an unaltered received signal will make it difficult to perform high-precision measuring. This unwanted noise can be removed by using a synchronous detector such as, for example, a lock-in amplifier.

Figure 7A:
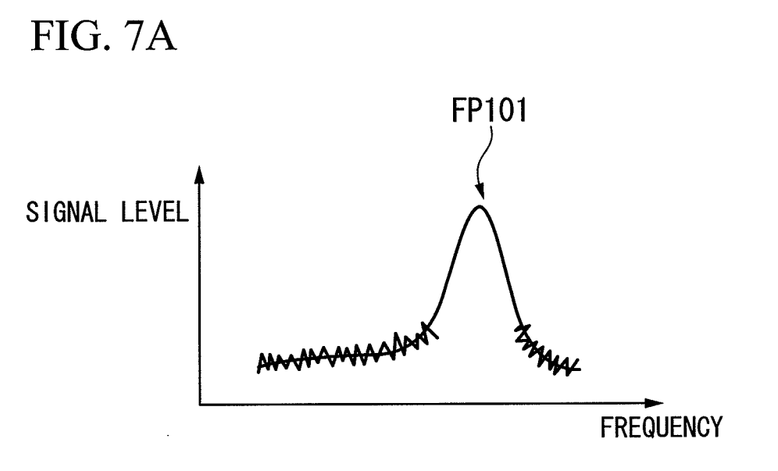
FIG. 7A is an example of received-light signal obtained by a conventional optical fiber characteristic measuring device.
Figure 7B:
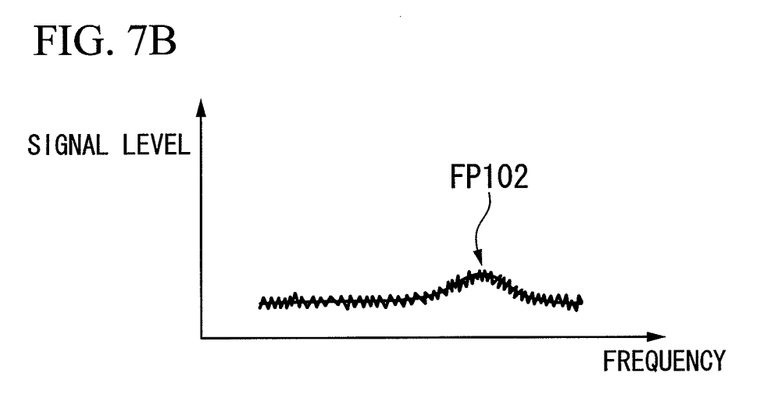
FIG. 7B is an example of received-light signal obtained by a conventional optical fiber characteristic measuring device.

However, even when using a synchronous detector, if a spatial resolution of the optical fiber characteristic measuring device is set to high, there is a problem of deterioration in the S/N ratio (signal-to-noise ratio). FIGS. 7A and 7B are diagrams showing examples of received-light signals obtained from a conventional optical fiber characteristic measuring device. When the spatial resolution is not very high, as shown in FIG. 7A, since the signal level is sufficiently high in comparison with the noise level, the peak frequency FP101 of the stimulated Brillouin scattering light can easily be detected. In contrast, to increase the spatial resolution, in the optical fiber characteristic measuring device disclosed in Patent Document 2 mentioned above, is to restrict the light from the vicinity of a measuring point used in measuring to a portion that is nearer to the measuring point. Consequently, when the spatial resolution is increased, as shown in FIG. 7B, the signal level decreases to the level that is approximately near the noise level, and the noise that is superimposed on the signal makes the S/N ratio deteriorate, making it difficult to detect the peak frequency FP102 of the stimulated Brillouin scattering light.

Figure 8A:
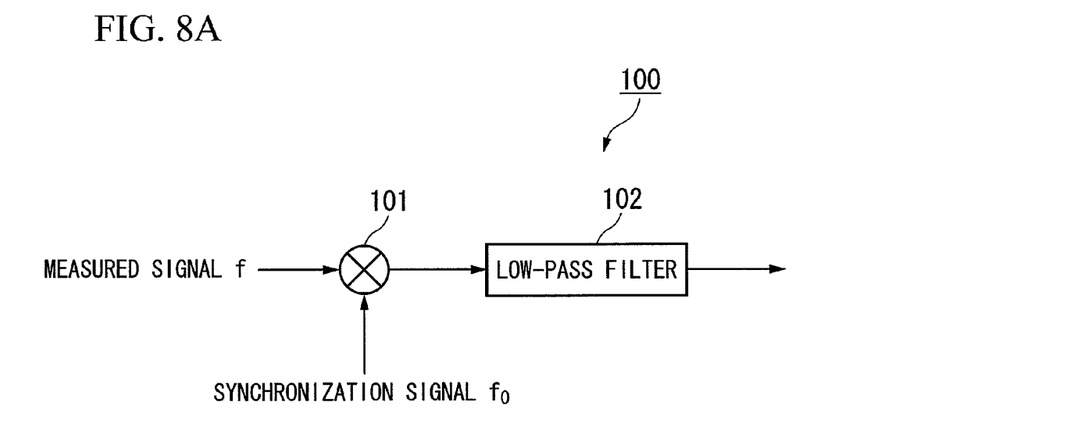
FIG. 8A is an example of a basic configuration of a conventional synchronous detector and an example of a signal outputted from the synchronous detector.
Figure 8B:
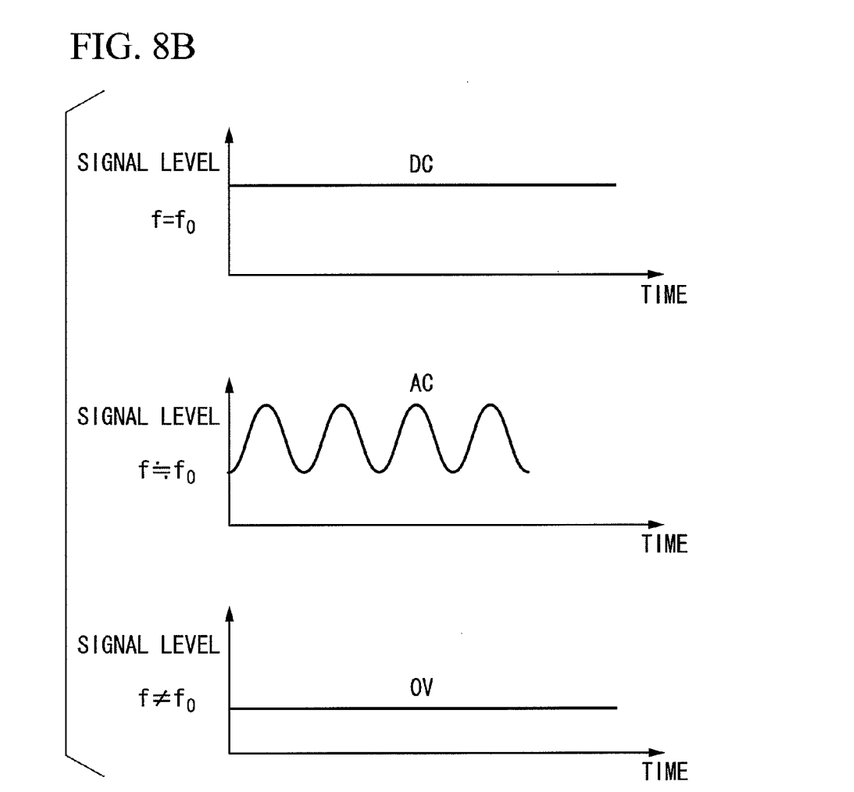
FIG. 8B is an example of a basic configuration of a conventional synchronous detector and an example of a signal outputted from the synchronous detector.

Also, when a synchronous detector is used in an attempt to remove the noise, there is a problem that this generates an unwanted fluctuation component in the signal and adversely affects the measurement precision. FIGS. 8A and 8B are diagrams showing a basic configuration of a conventional synchronous detector and examples of signals outputted from it. As shown in FIG. 8A, a synchronous detector 100 includes a multiplier 101 that multiplies a measured signal such as a received-light signal (its frequency is designated as f) and a predetermined synchronization signal (its frequency is designated as $f_0$), and a low-pass filter 102 that removes a high-frequency component from the signal multiplied by the multiplier 101. From among the signals multiplied by the multiplier 101, the synchronous detector 100 outputs a signal having a frequency component that passed the low-pass filter 102.

As shown in FIG. 8B, when a measured signal synchronized with the synchronization signal at the same frequency as the frequency $f_0$ of the synchronization signal is input (when $f=f_0$), the synchronous detector 100 outputs a direct current signal, and when a measured signal having a completely different frequency from the frequency $f_0$ of the synchronization signal is input (when $f \neq f_0$), it does not output a signal. Furthermore, when a measured signal at a frequency near the frequency $f_0$ of the synchronization signal is input (when $f \approx f_0$), the synchronous detector 100 outputs an alternating current signal having the differential between the frequencies as its frequency. Since the optical fiber characteristic measuring devices disclosed in Patent Documents 1 and 2 modulate the frequencies of both the pump light and the probe light, when the modulation frequency of the probe light and the like is near to the frequency $f_0$ of the synchronization signal used in the synchronous detector 100, the differential between the frequencies becomes the signal fluctuation component mentioned above and reduces the measurement precision.

Moreover, the synchronous detector 100 generally uses a rectangular signal with a duty ratio of 50% as the above-mentioned synchronous signal, and this synchronization signal contains a high frequency component of an odd multiple of the frequency $f_0$.

Therefore, if the measured signal inputted to the synchronous detector 100 contains a frequency component that is the same as or near to this high frequency component, as explained using FIG. 8B, there is a problem that this component is converted to a direct current signal or an alternating current signal and generates an error or a signal fluctuation component, whereby the measurement precision deteriorates.

The present invention has been realized in view of these circumstances, and an object thereof is to provide an optical fiber characteristic measuring device and method that, when using a synchronous detector, can suppress noise and a signal fluctuation component, and thereby achieve high precision.

Means for Solving the Problem

To solve these problems, an optical fiber characteristic measuring device of the present invention includes: a light source which emits laser light modulated at a predetermined modulation frequency; an incident section which causes the laser light from the light source as continuous light and pulsed light to be incident from one end and other end of an optical fiber respectively; a timing adjuster which causes light emitted from the optical fiber to pass therethrough at a predetermined timing; and a light detector which detects the light which passes through the timing adjuster, and measures a characteristic of the optical fiber by using a detection result of the light detector, and the device includes: a synchronous detector which synchronously detects the detection result of the light detector by using a synchronization signal having a predetermined frequency; and a frequency setter which changes the frequency of the synchronization signal in a case where the modulation frequency at the light source is an integer multiple of the frequency of the synchronous signal.

According to this invention, in the case where the modulation frequency at the light source is an integer multiple of the frequency of the synchronous signal used by the synchronous detector, the frequency of the synchronization signal is changed by the frequency setter, and a frequency signal having this changed frequency is used in synchronously detecting the detection result of the light detector.

Moreover, the optical fiber characteristic measuring device of the present invention may include: a noise remover that performs a Fourier transform to a detection signal of the synchronous detector to remove a predetermined frequency component and performs a reverse Fourier transform to a detection signal from which the predetermined frequency component is removed and thereby removes noise from the detection signal.

Further, the optical fiber characteristic measuring device of the present invention may include: a waveform approximator that approximates the detection signal from which the noise is removed by the noise remover by using a predetermined approximate expression.

Furthermore, the optical fiber characteristic measuring device of the present invention may include: a peak frequency calculator that detects a peak frequency from the detection signal approximated by the waveform approximator to determine the characteristic of the optical fiber.

In addition, in the optical fiber characteristic measuring device of the present invention, the modulation frequency at the light source may be set to a value that differs in correspondence with a position of a measuring point in the optical fiber, and the frequency setter may change the frequency of the synchronization signal such that each modulation frequency set at the light source does not become an integer multiple of the frequency of the synchronization signal.

An optical fiber characteristic measuring method of the present invention causes laser light modulated at a predetermined modulation frequency as continuous light and pulsed light to be incident from one end and other end of an optical fiber respectively, detects light emitted from the optical fiber by passing it at a predetermined timing, and measures a characteristic of the optical fiber by using a detection result, and the method includes the steps of: synchronously detecting the detection result of the light detector by using a predetermined synchronization signal; and changing a frequency of the synchronization signal in a case where the modulation frequency at the light source is an integer multiple of the frequency of the synchronization signal.

Effect of the Invention

According to the present invention, in the case where the modulation frequency at the light source is an integer multiple of the frequency of the synchronization signal used by the synchronous detector, the frequency of the synchronization signal is changed, and a frequency signal having this changed frequency is used in synchronously detecting the detection result of the light detector; therefore, it has an effect that even when using a synchronous detector, noise and signal fluctuation component can be suppressed and high measurement precision can be achieved.

Furthermore, according to an embodiment of the present invention, a Fourier transform and a reverse Fourier transform are performed to a detection signal to remove noise from it, and, after determining an approximation function by least square approximation, it has an effect that the detection precision of the peak frequency can be increased.

REFERENCE SYMBOLS

1 Optical fiber characteristic measuring device
11 Light source
12 Optical brancher
13 Light modulator
14 Light delayer
15 Optical isolator
16 Optical fiber
17 Pulse modulator
18 Directional coupler
19 Timing adjuster
20 Light detector
21 Synchronous detector
24a Frequency setter
24b Noise remover
24c Waveform approximator
24d Peak frequency calculator

BEST MODE FOR CARRYING OUT THE INVENTION

Figure 1:
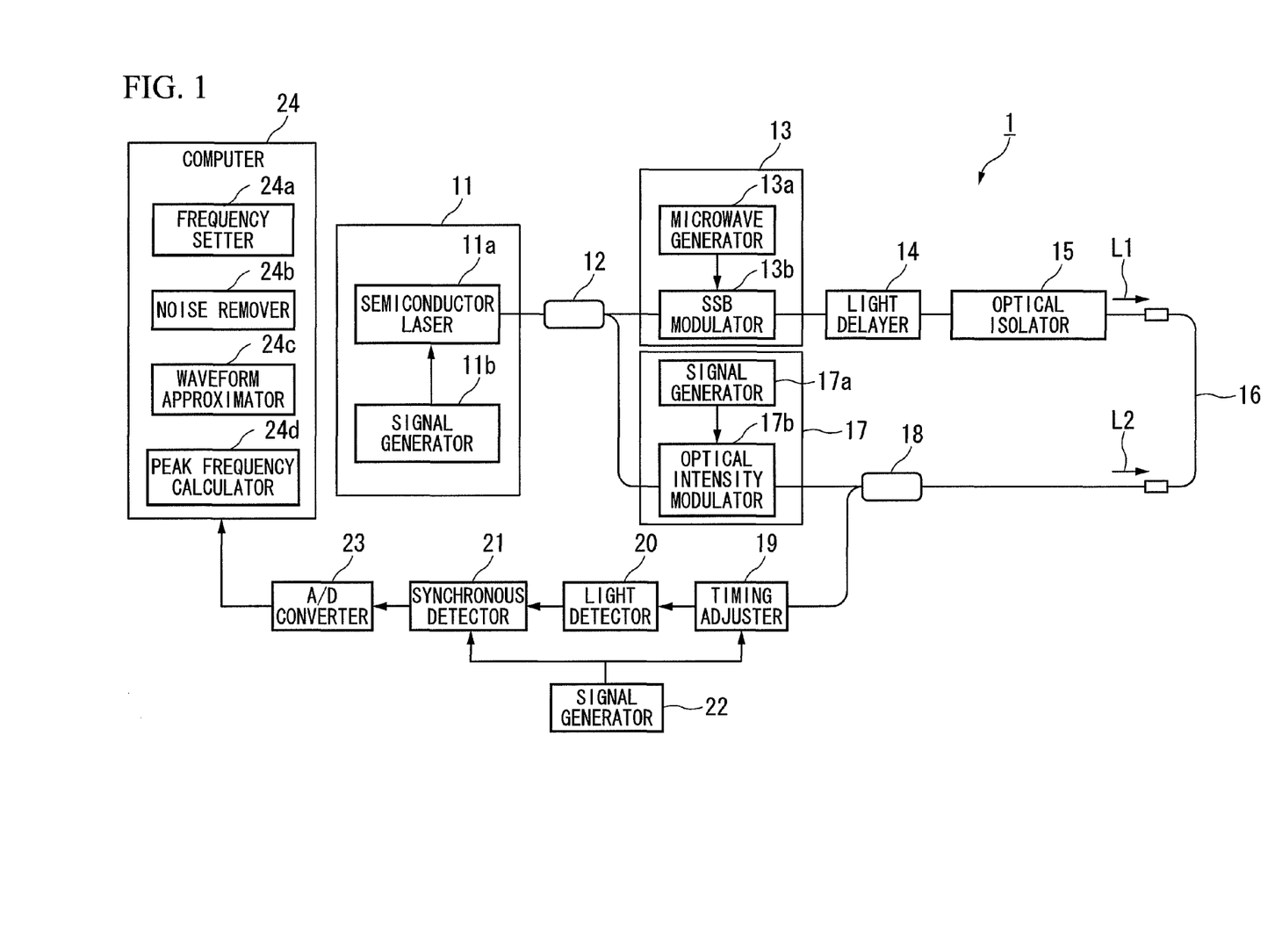
FIG. 1 is a block diagram showing a primary configuration of an optical fiber characteristic measuring device according to an embodiment of the invention.

Hereinafter, an optical fiber characteristic measuring device and method according to an embodiment of the invention will be explained in detail with reference to the drawings. FIG. 1 is a block diagram showing a primary configuration of an optical fiber characteristic measuring device according to an embodiment of the invention. As shown in FIG. 1, an optical fiber characteristic measuring device 1 of this embodiment includes a light source 11, an optical brancher 12, a light modulator 13, a light delayer 14, an optical isolator 15, an optical fiber 16, a pulse modulator 17, a directional coupler 18, a timing adjuster 19, a light detector 20, a synchronous detector 21, a signal generator 22, an A/D converter 23, and a computer 24.

The light source 11 includes a semiconductor laser 11a and a signal generator 11b, and emits laser light modulated with a predetermined modulated frequency $f_m$. As the semiconductor laser 11a, a multi-quantum well-distributed feedback laser diode (MQW DFB-LD) that is small and emits laser light with a narrow spectrum may be used, for example. The signal generator 11b is controlled by the computer 24, and outputs a sinusoidal signal (modulation signal) that modulates the laser light emitted from the semiconductor laser 11a at the modulation frequency $f_m$ to the semiconductor laser 11a. The optical brancher 12 branches the laser light emitted from the light source 11 to, for example, two branches with an intensity ratio of 1-to-1.

The light modulator 13, which includes a microwave generator 13a and a single side band (SSB) modulator 13b, modulates one of the laser lights branched by the optical brancher 12 (i.e. shifts its optical frequency) and generates a side band (single side band) for a center frequency of the laser light.

In this embodiment, it is supposed that a single side band on the low frequency side is output from the light modulator 13. The microwave generator 13a, under controlled by the computer 24, outputs a microwave having the frequency of the frequency shift portion applied to one of the laser lights branched by the optical brancher 12. The SSB modulator 13b generates a single side band having a frequency differential that is equivalent to the frequency of the microwave outputted from the microwave generator 13a with respect to the center frequency of the input light. The frequency of the microwave outputted from the microwave generator 13a is variable.

To adjust the position of the correlation peak formed in the optical fiber 16, the light delayer 14 delays the single side band emitted from the light modulator 13 by a predetermined time. Specifically, it delays the single side band emitted from the light modulator 13 such that the position where a 0th-order correlation peak occurs (the position where the optical path difference between a probe light L1 and a pump light L2 explained later is zero) is arranged at a predetermined position outside the optical fiber 16. The light delayer 14 delays the single side band emitted from the light modulator 13 by, for example, passing it through an optical fiber having a predetermined length (not shown). The optical isolator 15 allows light traveling from the light delayer 14 toward the optical fiber 16 to pass, and shuts off light traveling from the optical fiber 16 toward the light delayer 14. Light from the light delayer 14 that passes the optical isolator 15 and travels toward the optical fiber 16 enters the optical fiber 16 from one end of the optical fiber 16 as probe light L1.

The pulse modulator 17 includes a signal generator 17a and an optical intensity modulator 17b, and pulses the other laser light (continuous light) branched by the optical brancher 12. The signal generator 17a is controlled by the computer 24 to output a timing signal that defines the timing of pulsing the laser light. The optical intensity modulator 17b is, for example, an electro-optic (EO) switch, and pulses the laser light from the optical brancher 12 at a timing defined by the timing signal outputted from the optical intensity modulator 17b.

The directional coupler 18 makes the pulsed laser light outputted from the pulse modulator 17 incident into the optical fiber 16 as pump light 2 from the other end of the optical fiber 16; in addition, it emits light containing the probe light L1 that propagates in the optical fiber 16 and is emitted from the other end of the optical fiber 16 toward the timing adjuster 19. The intensity of light in the optical frequency band of the probe light L1 is influenced by the stimulated Brillouin scattering effect arising in the optical fiber 16.

The timing adjuster 19 switches to an open state or a closed state based on the timing signal outputted from the signal generator 22, and only passes stimulated Brillouin scattering light generated at a measuring point set in the optical fiber 16 (a point where a characteristic will be measured) and its vicinity. Specifically, based on the timing signal from the signal generator 22, it switches to the open state at a timing when stimulated Brillouin scattering light generated at the measuring point and its vicinity travels via the directional coupler 18 and reaches the timing adjuster 19, and switches to the off state at a timing when the stimulated Brillouin scattering light has passed through the timing adjuster 19.

The light detector 20 includes, for example, a high-sensitivity light-receiving element such as an avalanche photo-diode, which detects light that has passed the timing adjuster 19 and outputs a detection signal (received-light signal). In FIG. 1, which is a simplified example, in addition to the light-receiving element, the light detector 20 also includes an optical wavelength filter (not shown), and it selects only a low-frequency side band relating to the probe light L1 from the light that passed the timing adjuster 19, and detects its power. Since in this embodiment the SSB modulator 13b is employed, the above-mentioned wavelength filter may be omitted. Nonetheless, although the cost is increased by providing the wavelength filter, since unwanted frequency components can be suppressed, the measurement precision can be enhanced.

The synchronous detector 21 uses the synchronization signal having a predetermined frequency $f_0$ outputted from the signal generator 22 to synchronously detect the detection signal outputted from the light detector 20. As this synchronous detector 21, for example, a lock-in amplifier with the basic configuration shown in FIG. 8A may be used. The signal generator 22, controlled by the computer 24, generates a timing signal outputted to the timing adjuster 19, and generates a synchronization signal used by the synchronous detector 21. The frequency of the timing signal outputted to the timing adjuster 19 from the signal generator 22, the frequency $f_0$ of the synchronization signal out to the synchronous detector 21 from the signal generator 22, and the frequency of the timing signal outputted to the optical intensity modulator 17b from the signal generator 17a of the pulse modulator 17 are the same. The A/D converter 23 converts the signal that was synchronously detected by the synchronous detector 21 to a digital signal, and outputs it as detection data to the computer 24.

The computer 24 includes a frequency setter 24a, a noise remover 24b, a waveform approximator 24c, and a peak frequency calculator 24d. The computer 24 controls the collective operations of the optical fiber characteristic measuring device 1, and performs various processes for determining the characteristics of the optical fiber 16 with respect to the digital signal (detection data) outputted from the A/D converter 23. The frequency setter 24a sets the modulation frequency $f_m$ of the laser light emitted from the semiconductor laser 11a (the frequency of the sinusoidal signal outputted from the signal generator 11b), and, it performs settings, changes, and the like to the frequency $f_0$ of the synchronization signal used in the synchronous detector 21 (the synchronization signal outputted from the signal generator 22). When the modulation frequency $f_m$ of the laser light emitted from the semiconductor laser 11a is an integer multiple of the frequency $f_0$ of the synchronization signal, the frequency setter 24a changes the frequency $f_0$ of the synchronization signal.

The noise remover 24b removes a predetermined frequency component (noise frequency component) by performing a Fourier transform to the detection data outputted from the A/D converter 23, and performs a reverse Fourier transform to the detection data from which the frequency component was removed. Through this process, the noise remover 24b removes noise from the detection data outputted from the A/D converter 23.

The waveform approximator 24c uses a predetermined approximate expression to approximate the detection data, from which the noise remover 24b has removed noise. For example, the waveform approximator 24c uses least square method approximation to approximate the detection data from which noise was removed. While this embodiment describes an example of approximation using least square method, any given approximation method can be used to approximate the detection data from which noise was removed. The peak frequency calculator 24d determines a characteristic of the optical fiber (e.g. the size of strain, or its temperature) at a measuring point set by detecting the peak frequency from the detection data approximated by the waveform approximator 24c.

The frequency setter 24a, the noise remover 24b, the waveform approximator 24c, and the peak frequency calculator 24d provided in the computer 24 may be realized by hardware, or may be realized using software. When realizing them using software, the computer is made to implement programs that realize the functions of each of the units described above.

Figure 2:
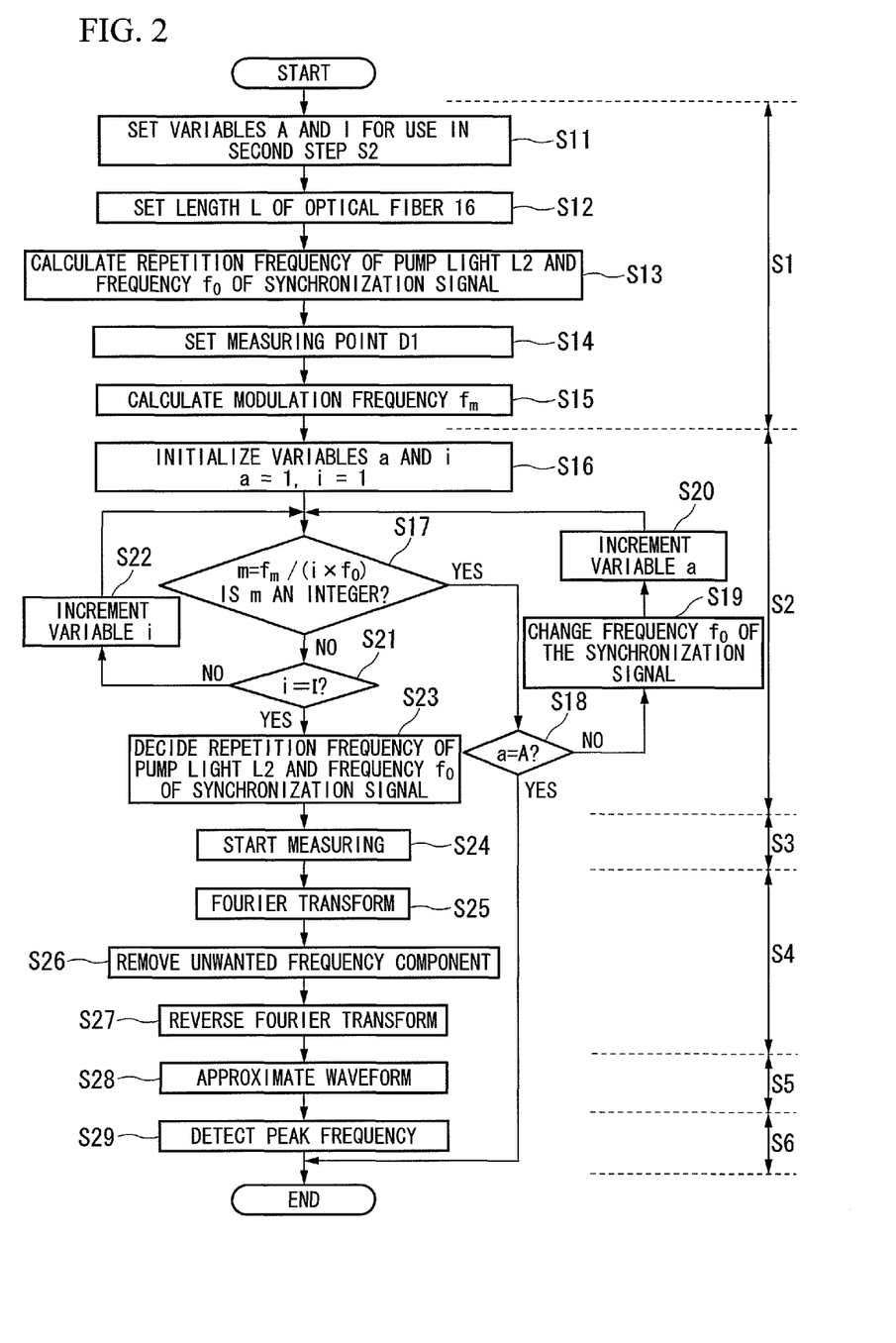
FIG. 2 is a flowchart showing an optical fiber characteristic measuring method according to an embodiment of the invention.

Subsequently, an operation of the optical fiber characteristic measuring device 1 having the configuration described above, that is, an optical fiber characteristic measuring method according to an embodiment of the invention, will be explained. FIG. 2 is a flowchart showing an optical fiber characteristic measuring method according to an embodiment of this invention. As shown in FIG. 2, the optical fiber characteristic measuring method of this embodiment is broadly divided into a first step S1 of setting measuring conditions, a second step S2 of deciding a frequency $f_0$ of the synchronization signal, a third step S3 of measuring the optical fiber 16, a fourth step S4 of removing noise from the measurement result, a fifth step S5 of approximating a waveform of the measurement result, and a sixth step S6 of detecting a peak frequency of stimulated Brillouin scattering light generated in the optical fiber 16.

When processing starts, the first step S1 of setting the measuring conditions is performed. In this first step S1, the frequency setter 24a of the computer 24 executes a process of setting values for variables A and I that will be used in deciding the frequency $f_0$ of the synchronization signal in the second step S2 (step S11). Variable A is used for preventing the process from becoming an infinite loop when the frequency setter 24a decides the synchronization signal $f_0$, and here it is assumed that the user sets this value to '5'. Variable I is used for defining the range of the frequency $f_0$ of the synchronization signal calculated by the frequency setter 24a when the modulation frequency $f_m$ of the laser light is an integer multiple of the frequency $f_0$ of the synchronization signal, and here it is assumed that the user sets this value to '3'.

Subsequently, a process of setting the length L of the optical fiber 16 is performed by the frequency setter 24a (step S12). It is assumed that the user sets the length L of the optical fiber 16 to 500 [m]. When the setting is complete, the frequency setter 24a performs a process of calculating the repetition frequency of the pump light L2 and the frequency $f_0$ of the synchronization signal is performed by the frequency setter 24a (step S13). When there are a plurality of correlation peaks at different positions in the optical fiber 16, if there are a plurality of light pulses (pump lights L2) in the optical fiber 16, measuring cannot be performed accurately. Accordingly, a process is performed to determine the repetition frequency of the pump light L2 to ensure that there is only one pulse (the pump light L2) in the optical fiber 16.

As already explained, the frequency of the timing signal outputted from the signal generator 17a of the pulse modulator 17 to the optical intensity modulator 17b (the repetition frequency of the pump light P2) is the same as the frequency $f_0$ of the synchronization signal outputted from the signal generator 22 to the synchronous detector 21. Therefore, to calculate the repetition frequency of the pump light L2 is to calculate the frequency $f_0$ of the synchronization signal. Specifically, if c is the light speed in a vacuum and n is the refractive index of the optical fiber 16, the repetition frequency of the pump light L2 and the frequency $f_0$ of the synchronization signal are calculated with the equation (1) below.

$$f_0=(c/n)/(2\times L) \quad (1)$$

For example, if the optical fiber refractive index n is 1.5 and the speed of the light in a vacuum is $3\times10^8$ [m/sec], from Equation (1) it is calculated that, for an optical fiber 16 having a length L of 500 [m], the frequency $f_0$ of the synchronization signal will be 200 [kHz].

Subsequently, a process of setting a measuring point D1 in the optical fiber 16 is performed by the frequency setter 24a (step S14). It is supposed that the user sets the measuring point D1 in the optical fiber 16 at a position of 100 [m] from one end of the optical fiber 16 (the end that the probe light L1 is incident to). When this setting is complete, a process of calculating the modulation frequency $f_m$ of the laser light in the light source 11 is performed by the frequency setter 24a (step S15). Specifically, if d is the distance from the end of the optical fiber 16 to the 0th-order correlation peak outside the optical fiber 16, and a is the order of a correlation peak formed inside the optical fiber 16, the modulation frequency $f_m$ of the laser light at the light source 11 is calculated from the following Equation (2).

$$f_m a\times(c/n)/(2\times(d+D1)) \quad (2)$$

For example, if the order a of the correlation peak is '10', from Equation (2) the modulation frequency $f_m$ at the measuring point D1 set at a position of 100. [m] from the other end of the optical fiber 16 is 10 [MHz]. By performing above processes, the first step S1 of setting the measuring conditions is ended.

When the first step S1 ends, the second step S2 of deciding the frequency $f_0$ of the synchronization signal is performed. In the second step S2, firstly a process of initializing variables a and i which are used in deciding the frequency $f_0$ of the synchronization signal is performed by the frequency setter 24a (step S 16). Specifically, the values of the variables a and i are both set to F. The frequency setter 24a then determines whether the modulation frequency $f_m$ calculated in step S15 is an integer multiple of the frequency $f_0$ of the synchronization signal calculated in step S13 (step S17). Specifically, it calculates the value of the variable m in the following Equation (3), and determines whether the value of this variable m is an integer.

$$m=f_m/(i\times f_0) \quad (3)$$

When the frequency $f_0$ of the synchronization signal calculated in step S13 described above is 200 [kHz] and the modulation frequency $f_m$ calculated in step S15 described above is 10 [MHz], the value of variable m in Equation (3) is '50'. Therefore, the determination result of step S17 is 'YES' and a process of changing the frequency $f_0$ of the synchronization signal is performed by the frequency setter 24a.

Specifically, it is first determined whether the value of variable a is equal to the variable A set in step S11 (step S18). Since the value of variable a is '1' and the value of variable A is '5', the determination result is 'NO'. The frequency $f_0$ of the synchronization signal is then changed by a predetermined amount (step S19). The change amount of the frequency $f_0$ of the synchronization signal is, for example, set to a frequency corresponding to the resolution of the signal generator 17a that defines the repetition frequency of the pump light L2. It is supposed that the resolution of the signal generator 17a is 20 [kHz] and the frequency $f_0$ of the synchronization signal is changed to 180 [kHz]. When the frequency $f_0$ of the synchronization signal is changed, the value of variable a is incremented (step S20).

When the process of changing the frequency $f_0$ of the synchronization signal ends, the frequency setter 24a calculates the value of variable m shown in above Equation (3) a second time, and determines whether this value of variable m is an integer (step S17). When the frequency $f_0$ of the synchronization signal is changed to 180 [kHz], the value of variable m expressed in above Equation (3) becomes '55.55', and the result determined by the frequency setter 24a in step S17 is therefore 'NO'. The frequency setter 24a then determines whether the value of variable i is equal to the value of variable I set in step S11 (step S21). Since the value of variable i is '1' and the value of variable I is '3', the determination result here is 'NO'; accordingly, the frequency setter 24a increments the value of variable i (step S22) and returns for a third time to the process of step S17.

When the value of variable m determined in step S17 is not an integer and the value of variable i is not equal to the value of variable I, the processes of steps S17, S21, and S22 are repeated, and the value of variable m is calculated from above Equation (3) while changing the value of variable i. Specifically, when the value of variable i is '2', the value of variable m becomes '27.77', and when the value of variable i is '3', the value of variable m becomes '18.15'. When the value of variable i becomes equal to the value '3' of variable A set in step S11, the determination result of step S21 becomes 'YES', and a process of deciding the frequency $f_0$ of the synchronization signal is performed by the frequency setter 24a (step S23). Here, variable m, which shows the ratio between a frequency of an even multiple and a frequency of an odd multiple of the frequency $f_0$ of the synchronization signal and the modulation frequency $f_m$, is determined using variable i, it would be acceptable to determine only variable m that shows the ratio between an odd multiple of the frequency $f_0$ of the synchronization signal and the modulation frequency $f_m$.

Specifically, when the frequency $f_0$ of the synchronization signal is 180 [kHz], since changing the value of variable i in above Equation (3) will not produce an integer, the frequency setter 24a sets the frequency $f_0$ of the synchronization signal (the repetition frequency of the pump light L2) to 180 [kHz]. By the above processes, the second step S2 of deciding the frequency $f_0$ of the synchronization signal is ended. The processes of steps S18 to S20 are repeated during the period when the determination result of the step S17 is 'YES', and, when the value of variable a becomes equal to the variable A set in step S11 while these processes being repeated, the determination result in step S18 becomes 'YES'. Accordingly, the frequency setter 24a ends the series of processes since measuring is not possible.

When the second step S2 ends, the third step S3 of measuring the optical fiber 16 is performed. In this third step S3, processes are performed in which the modulation frequency $f_m$ of the laser light at the light source 11 is set to the modulation frequency calculated in step S15 (e.g. 10 [MHz]), and, the frequency $f_0$ of the synchronization signal used in the synchronous detector 21 and the repetition frequency of the pump light L2 (and also the operating frequency of the timing adjuster 19) are set to the frequency decided in step S23 (e.g. 180 [kHz]). These setting are performed by outputting control signals from the frequency setter 24a to each of the signal generator 11b of the light source 11, the signal generator 17a of the pulse modulator 17, and the signal generator 22.

When these settings are completed, laser light having the modulation frequency $f_m$ calculated in step S15 is emitted from the light source 11 and branched by the optical brancher 12. One of the laser lights branched by the optical brancher 12 is incident to the light modulator 13 and modified by the SSB modulator 13b, generating a single side band for the center frequency of the laser light. Laser light having a single side band (continuous light) emitted from the light modulator 13 is delayed by a predetermined amount in the light delayer 14, and thereafter, passes through the optical isolator 15, and is incident to the optical fiber 16 from one end of the optical fiber 16 as probe light L1. Meanwhile, the other laser light that was branched by the optical brancher 12 is incident to the pulse modulator 17, where it is pulsed and converted to pulse light having the repetition frequency decided in step S23. This pulse light passes the directional coupler 18 and is incident to the optical fiber 16 from the other end of the optical fiber 16 as pump light L2.

Figure 3:
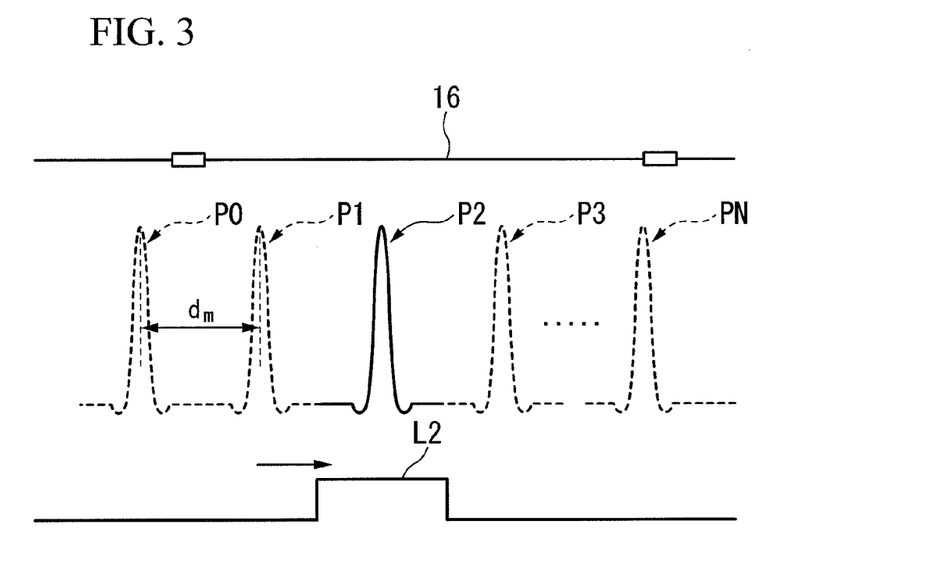
FIG. 3 is a diagram showing correlation peaks generated in an optical fiber 16 as pump light progresses.

As shown in FIG. 3, when the probe light L1 of continuous light that was frequency-modulated with the modulation frequency $f_m$ and the pulsed pump light L2 are incident to the optical fiber 16, as the pump light L2 propagates along the optical fiber 16, correlation peaks P0 to PN (N is a positive integer) are generated at different positions in the optical fiber 16. FIG. 3 is a diagram showing correlation peaks generated in the optical fiber 16 as the pump light progresses. In the example shown in FIG. 3, the light pulse passes near correlation peak P2. Correlation peaks P0 and P1 represented by broken lines are correlation peaks that the light pulse passed in the past, while correlation peaks P3 and PN are correlation peaks that it will pass as the pump light L2 progresses.

The interval between the correlation peaks shown in FIG. 3 is $d_m$, and is expressed by following Equation (4):

$$d_m = (c/n)/(2 \times f_m) \qquad (4)$$

That is, the interval $d_m$ between the correlation peaks can be changed by changing the modulation frequency $f_m$ at the light source 11, whereby the positions where the correlation peaks P1 to Pn are generated can be moved. However, the position of the 0th-order correlation peak P0, which is generated at a position where the optical path difference between the probe light L1 and the pump light L2 becomes zero, cannot be moved by changing the modulation frequency $f_m$. Therefore, as shown in FIG. 3, the amount of delay applied at the light delayer 14 (see FIG. 1) is set such that the position of the 0th-order correlation peak P0 is outside the optical fiber 16.

Figure 4:
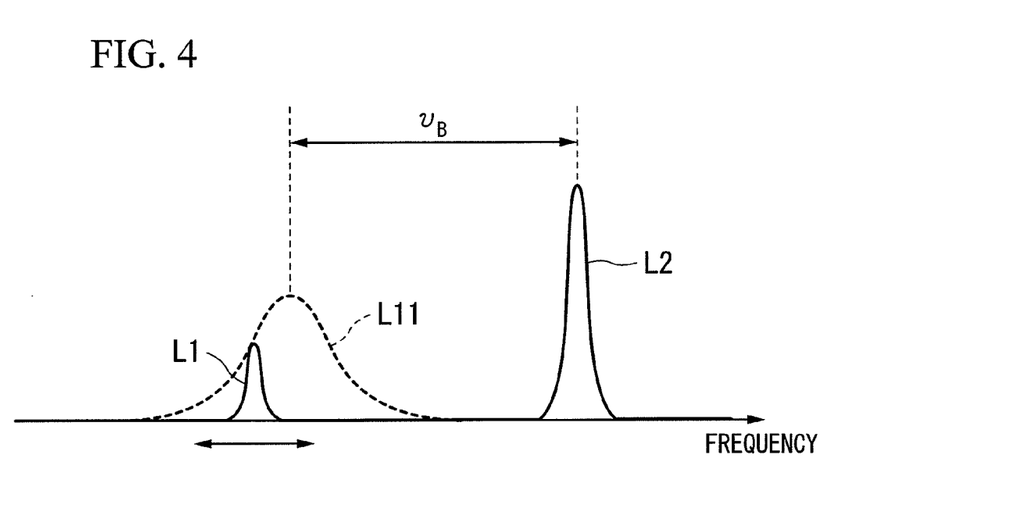
FIG. 4 is a diagram showing an example of a Brillouin gain spectrum.

At each of the correlation peaks P0 to P3, the probe light L1 achieves a gain due to stimulated Brillouin amplification by the pump light L2. As shown in FIG. 4, at the correlation peak, when the frequency difference between the pump light L2 and the probe light L1 is varied with the pump light L2 as a reference, a spectrum L11 called as a Brillouin gain spectrum (BGS) shaped as a Lorenz coefficient with Brillouin frequency shift $v_B$ as a center frequency is obtained. FIG. 4 is an example of a Brillouin gain spectrum. Brillouin frequency shift $v_B$ changes depending on the material, temperature, strain, and such like of the optical fiber 16; in particular, it is known to change linearly with respect to strain. Therefore, by detecting the peak frequency of the Brillouin gain spectrum L11 shown in FIG. 4, the amount of strain of the optical fiber 16 can be determined.

After probe light L1 passing through the optical fiber 16 and stimulated Brillouin scattering light generated inside the optical fiber 16, they are emitted from the other end of the optical fiber 16, they are incident to the directional coupler 18. The probe light L1 emitted from the directional coupler 18 is incident to the timing adjuster 19, only probe light L1 incident at a timing defined by the timing adjuster 19 and stimulated Brillouin scattering light being able to pass the timing adjuster 19. That is, by adjusting the timing of the timing adjuster 19, it is possible to obtain stimulated Brillouin scattering light that was generated at or near a set measuring point.

Figure 5:
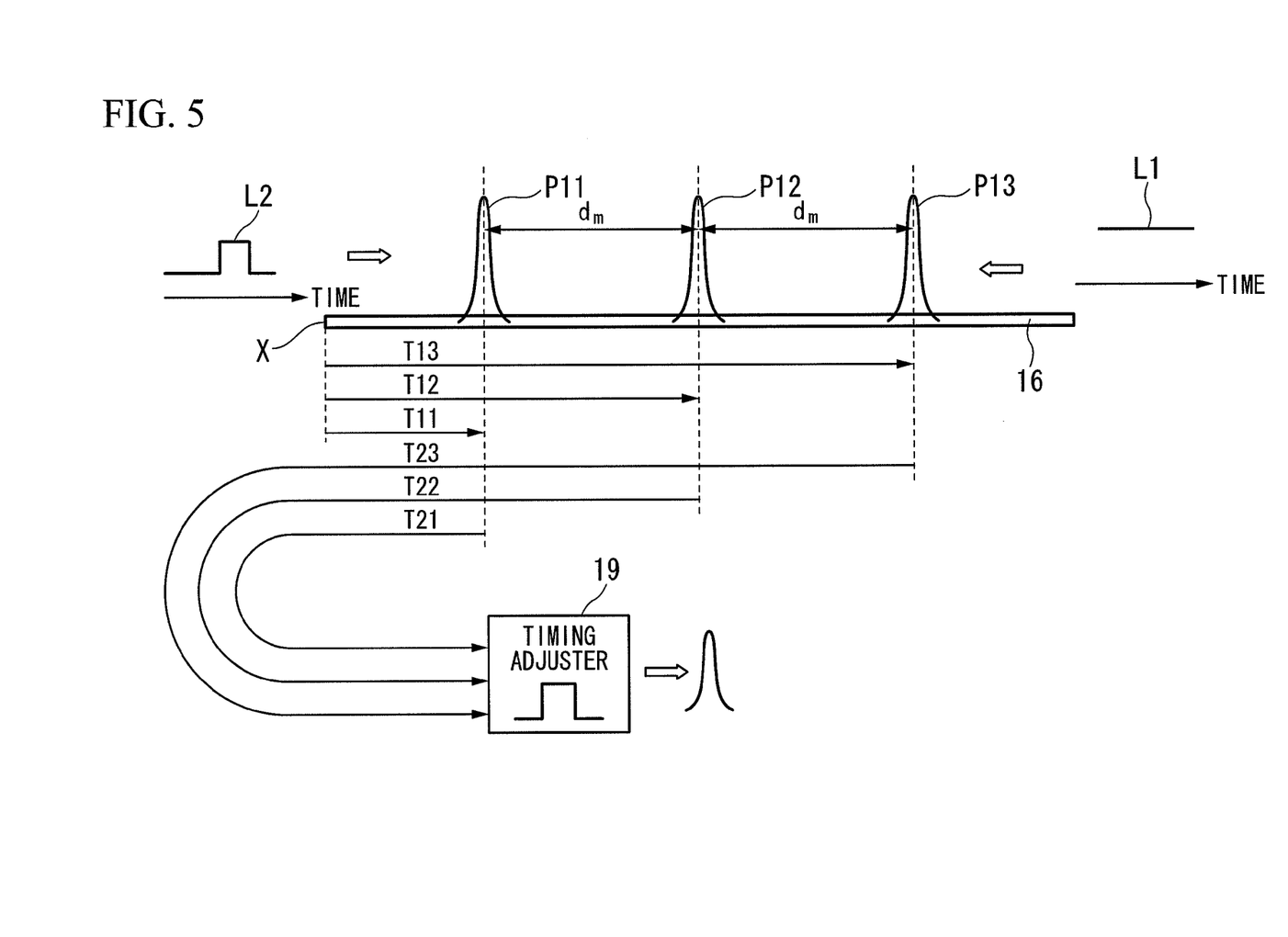
FIG. 5 is a diagram for illustrating the operation of a timing adjuster 19.

FIG. 5 is a diagram for illustrating an operation of the timing adjuster 19. As shown in FIG. 5, it is supposed that, as the pump light L2 propagates in the optical fiber 16, correlation peaks P11, P12, and P13 are generated at an interval of $d_m$. T11, T12, and T13 are the times required for the pump light L2 from the other end X of the optical fiber 16 to reach the correlation peaks P11, P12, and P13 respectively. T21, T22, and T23 are the times required for the stimulated Brillouin scattering light generated at the correlation peaks P11, P12, and P13 respectively to reach the timing adjuster 19.

When the measuring point is set at the generation position of correlation peak P11, if the timing adjuster 19 is set to an open state when a time of T11+T21 has elapsed from the moment when the pump light L2 was incident to the other end X of the optical fiber 16, stimulated Brillouin scattering light generated at the position of correlation peak P11 is obtained. Similarly, when it is desired to obtain stimulated Brillouin scattering light generated at the position of correlation peak P12, the timing adjuster 19 is set to the open state when a time of T12+T22 has elapsed from the moment when the pump light L2 was incident to the other end X; and when it is desired to obtain stimulated Brillouin scattering light generated at the position of correlation peak P13, the timing adjuster 19 is set to the open state when a time of T13+T23 has elapsed from the moment when the pump light L2 was incident to the other end X.

The probe light L1 and stimulated Brillouin scattering light that have passed the timing adjuster 19 are incident to the light detector 20, where light of side band at a low-frequency side is selected by a wavelength filter not shown included in the light detector 20 and its intensity is detected. Then, the light detector 20 outputs a detection signal indicating the detection result. This detection signal is input to the synchronous detector 21, which synchronously detects it and removes noise.

The frequency $f_0$ of the synchronization signal used by the synchronous detector 21 is set at a frequency such that the modulation frequency $f_m$ used at the light source 11 is not an integer multiple of the frequency $f_0$ (in other words, a frequency such that the frequency $f_0$ of the synchronization signal is not an integer fraction of the modulation frequency $f_m$ used at the light source 11). Consequently, even if a rectangular signal which has a duty ratio of 50% and contains an odd-degree high frequency component of the frequency $f_0$ is used as the synchronous signal, the frequency difference between the frequency of the detection signal inputted to the synchronous detector 21 and the high frequency component of the synchronization signal can be increased. As a result, it is possible to prevent errors or the generation of a signal fluctuation component when there is a small frequency difference between the measured signal f (detection signal) the high frequency component of the synchronization signal explained using FIGS. 8A and 8B, and the measurement precision can be increased. The detection signal from which the synchronous detector 21 has removed noise is inputted to the A/D converter 23, where it is converted to a digital signal, and inputted as detection data to the computer 24.

The process described above is performed repeatedly while varying the frequency difference between the pump light L2 and the probe light L1, whereby detection data indicating the Brillouin gain spectrum L11 shown in FIG. 4 accumulates in the computer 24. By the above processes, the third step S3 of measuring the optical fiber 16 is ended. When the third step S3 ends, the computer 24 sequentially executes a fourth step S4 of removing noise from the measurement result, a fifth step S5 of approximating the waveform of the measurement result, and a sixth step S6 of detecting a peak frequency of stimulated Brillouin scattering light (Brillouin gain spectrum) generated in the optical fiber 16.

FIGS. 6A to 6D are diagrams for illustrating processes performed in the third step S3 to the sixth step S6. Firstly, in the fourth step S4, the noise remover 24 executes a Fourier transform to the detection data accumulated in the third step S3 (step S25). This transform enables the detection data (the Brillouin gain spectrum SP1 with noise N superimposed shown in FIG. 6A) to be separated into the frequency components shown in FIG. 6B.

Figure 6A:
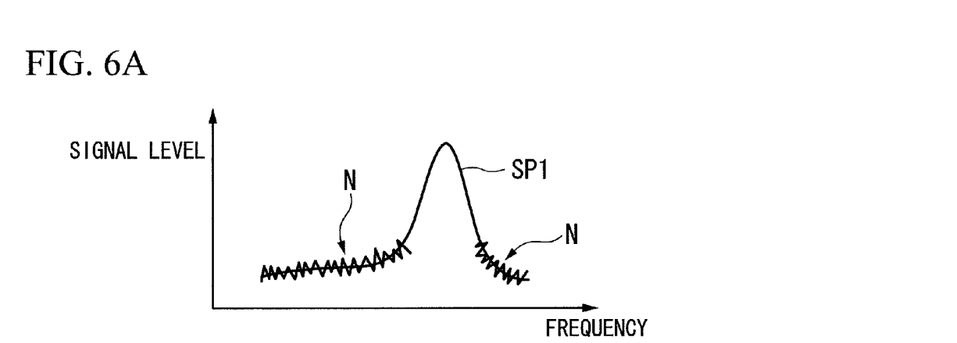
FIG. 6A is a diagram for illustrating processes performed from a third step S3 to a sixth step S6.
Figure 6B:
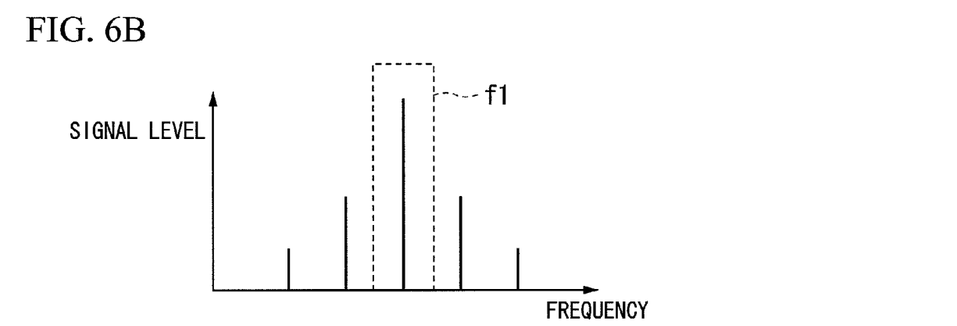
FIG. 6B is a diagram for illustrating processes performed from the third step S3 to the sixth step S6.
Figure 6C:
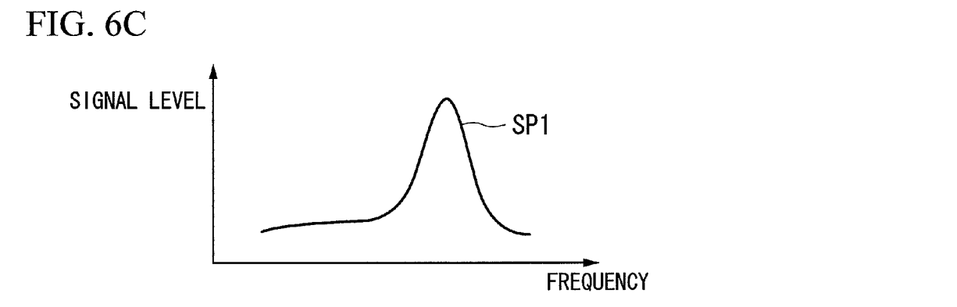
FIG. 6C is a diagram for illustrating processes performed from the third step S3 to the sixth step S6.
Figure 6D:
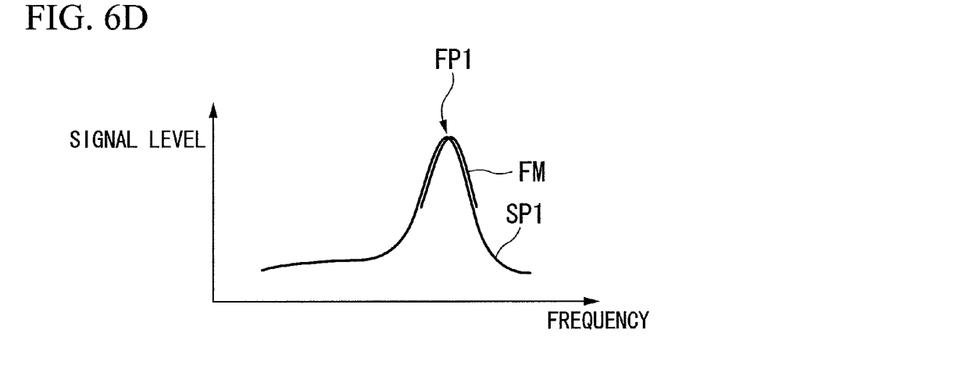
FIG. 6D is a diagram for illustrating processes performed from the third step S3 to the sixth step S6.

Next, the noise remover 24b removes unwanted frequency components from among the frequency components separated by the Fourier transform (step S26). For example, it removes a frequency component that is a different frequency to the Brillouin gain spectrum (BGS) waveform and has a lower signal level than a predetermined level as a frequency component of noise N. In the example of FIG. 6B, it removes frequency components other than the one with reference symbol f1 appended. The noise remover 24b then executes a reverse Fourier transform to the detection data from which the unwanted frequency component was removed (step S27). By performing the above processes, as shown in FIG. 6C, the Brillouin gain spectrum SP1 from which noise was removed as shown in FIG. 6A can be obtained. By the above, the fourth step S4 of removing noise from the measurement result is ended.

When the fourth step S4 ends, the fifth step S5 of approximating the waveform of the measurement result is performed. In the fifth step S5, the waveform approximator 24c uses least square approximation method to approximate the Brillouin gain spectrum SP1 from which the noise remover 24b removed noise, and obtains the approximation function FM shown in FIG. 6D (step S28). Here, least square approximation method denotes an approximation that, when using a specific function to approximate a measurement result, is performed using a method (least square method) of determining a coefficient that minimizes the square sum of the residual of the measurement result and the function. This process is performed to minimize the detection error when detecting the peak frequency of the Brillouin gain spectrum SP1. By the above, the fifth step S5 of approximating the waveform of the measurement result is ended.

When the fifth step S5 ends, the sixth step S6 of detecting the peak frequency of the stimulated Brillouin scattering light (Brillouin gain spectrum) generated in the optical fiber 16 is performed. In this sixth step S6, the peak frequency calculator 24d determines a maximum value of the approximation coefficient FM determined in the fifth step S5, and calculates the frequency that obtains this maximum value as peak frequency FP1 (step S29). By the above, the sixth step S6 of detecting the peak frequency is ended. To measure characteristics in the long direction of the optical fiber 16, the processes of the first step S1 to the sixth step S6 need only to be repeated while changing the position of the measuring point set in the optical fiber 16.

As explained above, in this embodiment, since the detection signal from the light detector 20 is synchronously detected by the synchronous detector 21, the S/N ratio can be prevented from deteriorating even if the spatial resolution of the optical fiber characteristic measuring device 1 is increased. In this embodiment, when the modulation frequency $f_m$ at the light source 11 is an integer multiple of the frequency $f_0$ of the synchronization signal, the frequency $f_0$ of the synchronization signal is changed. This makes it possible to increase the frequency difference between the frequency of the detection signal outputted from the light detector 20 and the synchronization signal used in the synchronous detector 21 or a high frequency thereof. As a result, even if a rectangular wave containing a high frequency component is used as the synchronization signal, generation of errors or signal fluctuation component can be prevented, and the measurement precision can be increased.

Furthermore, in this embodiment, a Fourier transform and a reverse Fourier transform are performed to the detection signal that was synchronously detected and converted to a digital signal (detection data) to remove noise from it, and, after determining an approximation function by least square approximation, the peak frequency is determined. This can achieve considerably greater peak frequency detection precision than is conventional. As a result, the spatial resolution of the optical fiber characteristic measuring device 1 can be increased to approximately several centimeters.

While the optical fiber characteristic measuring device and method according to an embodiment of the invention have been described and illustrated above, the invention is not limited to this embodiment, and can be modified freely within the scope of the invention. For example, in the embodiment described above, in the processes of steps S17 to S23, the processes are performed in which a frequency $f_0$ from which a variable m that does not reach a predetermined integer number is obtained is determined as the frequency $f_0$ of the synchronization signal. However, the frequency $f_0$ of the synchronization signal can be determined based on the value of variable m itself calculated in step S17. For example, it is acceptable to determine the remainder obtained when a variable m determined by inserting a given frequency $f_0$ is divided with an integer, and, when this remainder is within a range of 0.1 to 0.9, set it as the frequency $f_0$ of the synchronization signal. That is, preferably, when the remainder is smaller than 0.1 or greater than 0.9, it is deemed to be near an integer, and the frequency $f_0$ from which this variable m is obtained is not used as the frequency $f_0$ of the synchronization signal.

INDUSTRIAL APPLICABILITY

The present invention can be applied in an optical fiber characteristic measuring device and method. According to the optical fiber characteristic measuring device and method, even when using a synchronous detector, noise and signal fluctuation component can be suppressed and high measurement precision can be achieved.

The invention claimed is:

1. An optical fiber characteristic measuring device which includes: a light source which emits laser light modulated at a predetermined modulation frequency; an incident section which causes the laser light from the light source as continuous light and pulsed light to be incident from one end and other end of an optical fiber respectively; a timing adjuster which causes light emitted from the optical fiber to pass therethrough at a predetermined timing; and a light detector which detects the light which passes through the timing adjuster, and measures a characteristic of the optical fiber by using a detection result of the light detector, the device comprising:

a frequency setter configured to calculate a frequency from an equation, the frequency setter configured to divide the modulation frequency by an odd multiple of the calculated frequency to calculate a value, the frequency setter configured to determine whether the value is an integer, the frequency setter configured to change the calculated frequency by a predetermined amount in a case where the frequency setter has determined that the value is an integer, the frequency setter configured to decide to use the calculated frequency in a case where the frequency setter has determined that the value is not an integer; and a synchronous detector configured to use a synchronization signal having the calculated frequency which the frequency setter has decided to use, the synchronous detector configured to synchronously detect the detection result of the light detector by using the synchronization signal.

2. The optical fiber characteristic measuring device according to claim 1, comprising:

a noise remover configured to perform a Fourier transform to a detection signal of the synchronous detector to remove a predetermined frequency component and perform a reverse Fourier transform to a detection signal from which the predetermined frequency component is removed to thereby remove noise from the detection signal.

3. The optical fiber characteristic measuring device according to claim 2, comprising:

a waveform approximator configured to approximate the detection signal from which the noise is removed by the noise remover by using a predetermined approximate expression.

4. The optical fiber characteristic measuring device according to claim 3, comprising:

a peak frequency calculator configured to detect a peak frequency from the detection signal approximated by the waveform approximator to determine the characteristic of the optical fiber.

5. The optical fiber characteristic measuring device according to claim 1, wherein the frequency setter is configured to set the modulation frequency at the light source to a value that differs in correspondence with a position of a measuring point in the optical fiber.

6. An optical fiber characteristic measuring method which causes laser light modulated at a predetermined modulation frequency as continuous light and pulsed light to be incident from one end and other end of an optical fiber respectively, detects light emitted from the optical fiber by passing the light emitted from the optical fiber at a predetermined timing, and measures a characteristic of the optical fiber by using a detection result, the method comprising the steps of:

calculating a frequency from an equation;

calculating a value by dividing the modulation frequency by an odd multiple of the calculated frequency;

determining whether the value is an integer;

changing the calculated frequency by a predetermined amount in a case where the value is determined to be an integer;

deciding to use the calculated frequency in a case where the value is determined to be not an integer; and synchronously detecting the detection result by using a synchronization signal having the calculated frequency decided to be used.

7. The optical fiber characteristic measuring device according to claim 2, wherein the frequency setter is configured to set the modulation frequency at the light source to a value that differs in correspondence with a position of a measuring point in the optical fiber.

8. The optical fiber characteristic measuring device according to claim 3, wherein the frequency setter is configured to set the modulation frequency at the light source to a value that differs in correspondence with a position of a measuring point in the optical fiber.

9. The optical fiber characteristic measuring device according to claim 4, wherein the frequency setter is configured to set the modulation frequency at the light source to a value that differs in correspondence with a position of a measuring point in the optical fiber.

* * * * *